Sept. 29, 1936.  C. MORROW  2,055,501

FLOAT SWITCH

Filed April 27, 1932  2 Sheets-Sheet 1

INVENTOR.
Clifford Morrow
BY
Geo. B. Pitts
ATTORNEY.

Sept. 29, 1936.   C. MORROW   2,055,501
FLOAT SWITCH
Filed April 27, 1932   2 Sheets-Sheet 2
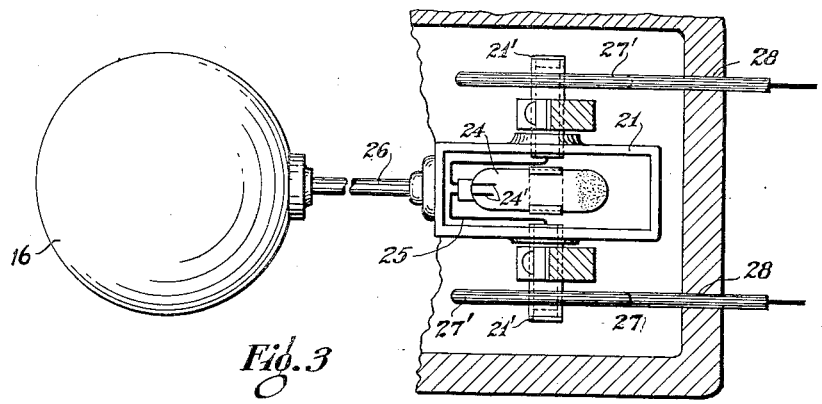
Fig. 3
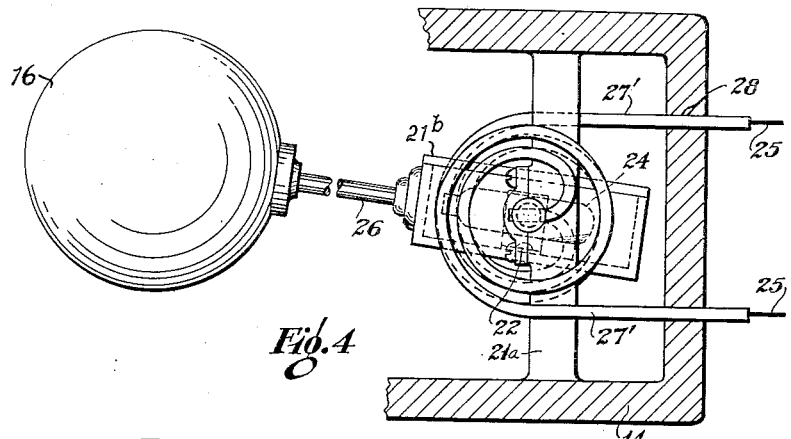
Fig. 4
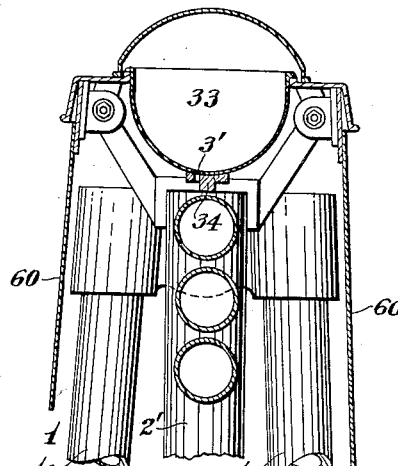
Fig. 2
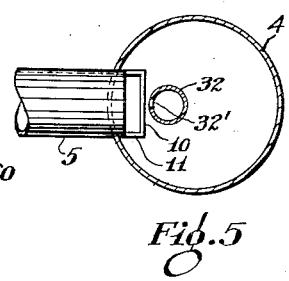
Fig. 5
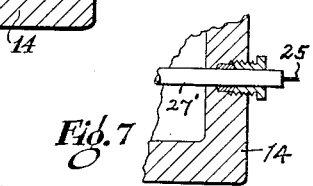
Fig. 7
Fig. 6
INVENTOR.
Clifford Morrow
BY Geo A. Pitts
ATTORNEY.

Patented Sept. 29, 1936

2,055,501

UNITED STATES PATENT OFFICE 2,055,501

FLOAT SWITCH

Clifford Morrow, Canton, Ohio, assignor to The H. H. Miller Industries Company, Canton, Ohio, a corporation of Ohio Application April 27, 1932, Serial No. 607,765

4 Claims. (Cl. 200—84)

This invention relates to liquid treating apparatus of the type in which a heat transfer medium circulates through pipes over which the liquid to be treated, flows. In the use of the term liquid I have particularly in mind milk and cream, but other liquids may be treated. The apparatus herein disclosed is adapted to cool the milk to a relatively low temperature, whereby it may be stored in bulk, bottled for distribution or otherwise used.

One object of the invention is to provide in a cooling apparatus having a circulating system for a volatile liquid refrigerant, improved means for controlling the supply of the liquid ammonia to the system.

Another object of the invention is to provide in a cooling apparatus having a circulating system for a liquid refrigerant having a relatively low boiling point, an improved float controlled valve operating mechanism which is relatively simple and positive in operation.

Other objects of the invention will be apparent to those skilled in the art to which my invention relates from the following description taken in connection with the accompanying drawings, wherein Fig. 1 is a view, partly in section and partly in elevation, embodying my invention.

Figs. 2 and 3 are fragmentary sections on the lines 2—2 and 3—3 of Fig. 1, respectively.

Fig. 4 is a section on the line 4—4 of Fig. 3.

Fig. 5 is a fragmentary section on the line 5—5 of Fig. 1.

Fig. 6 is a fragmentary section on the line 6—6 of Fig. 3.

Fig. 7 is a fragmentary section showing a modified form of construction.

Figure 1:
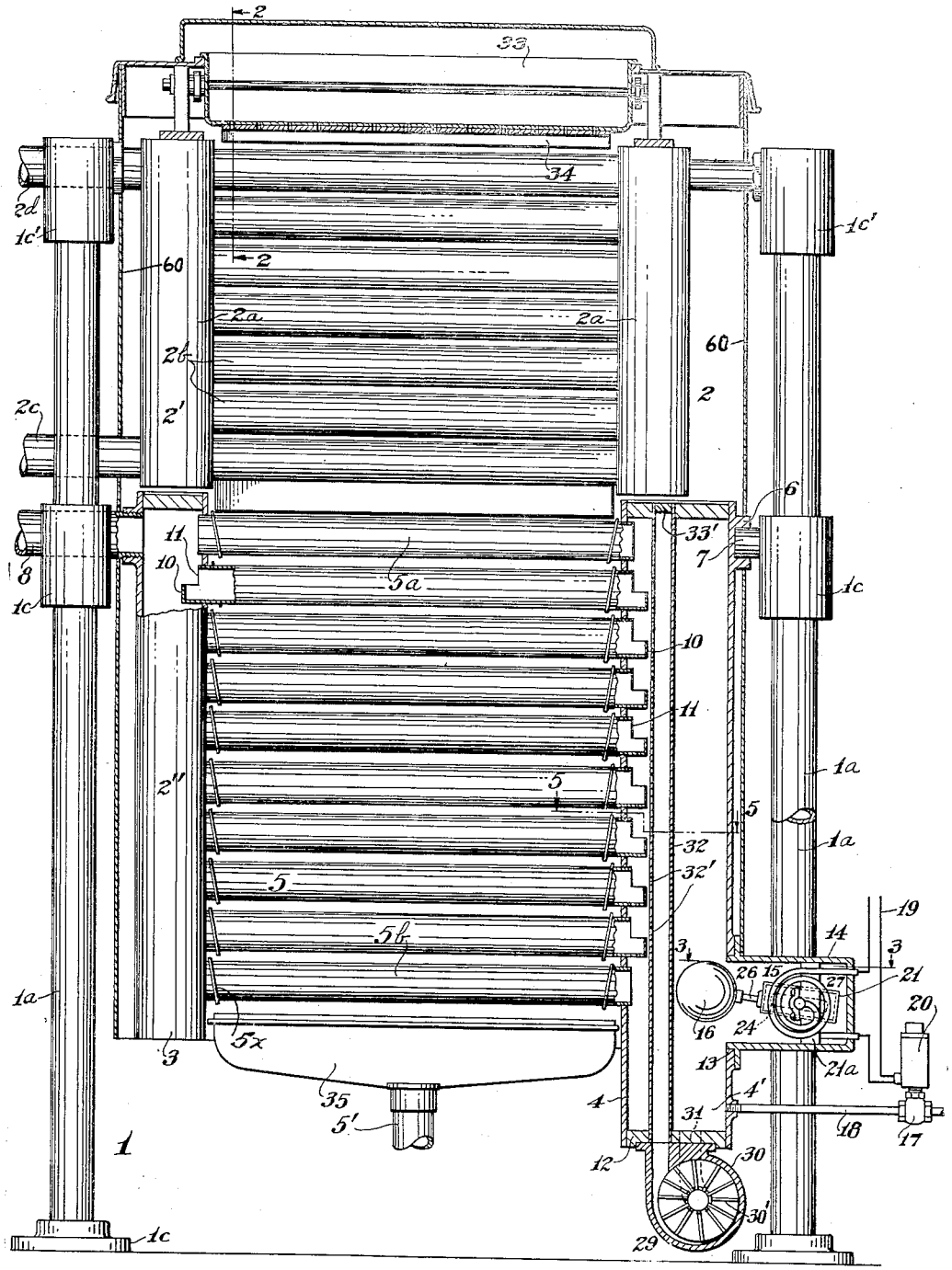

In the drawings, 1 indicates as an entirety a frame work, preferably comprising a pair of spaced members 1a, 1a, preferably formed from bars or piping 1b suitably connected together by braces 1c, 1c', and supported on adjustable caps 1c.

2 indicates as an entirety the circulating means for a heat transfer medium or mediums. The circulating means 2 is preferably arranged in vertically disposed sections or units 2', 2'', whereby different mediums may be used. In the construction shown, the unit 2'' is constructed to utilize liquid ammonia.

The unit 2' consists of headers 2a, 2a, connected by pipes 2b, one header 2a being connected at its lower end with a cold water or brine supply pipe 2c and to a discharge pipe 2d for such cooling medium leading from its upper end.

The unit 2' may be constructed and mounted similar to one of the units 2' shown and described in the U. S. Letters Patent No. 1,352,215, granted Sept. 7, 1920, to Leroy S. Pfouts.

Of the unit 2'', 3, 4, indicate headers and 5 indicates a series of pipes disposed in the same vertical plane and the plane of the pipes 2b and leading through the side walls of the headers, these parts being rigidly connected in any well known manner. The upper end of the header 4 is provided with a boss 6 in which is screwed a rod or pipe section 7. The outer end of the section 7 is mounted in the adjacent brace 1c to support one end of the unit. The opposite end of the unit is supported in a similar manner, except that the pipe section, indicated at 8, registers at its inner end with an opening formed in the header 3 and its outer end leads through the adjacent brace 1c and is connected to the intake of a compressor (not shown), whereby the vapors generated in the unit 2'' are withdrawn therefrom. The pipe 8 is provided with a back pressure valve (not shown) operable to control the temperature in the unit 2''. The header 4 extends down below the pipes 5 to form a reservoir 4' for the liquid ammonia. The liquid ammonia is supplied from the reservoir 4' to the pipes 5, except the uppermost and lowermost pipes (designated 5a, 5b), in the manner to be later set forth. The pipe 5a forms an escape conduit for vapors flowing from the pipes 5 and rising in the header 4 and conducts them to the header 3, from which such vapors and those rising in header 3 flow through the conduit 8 to the compressor. The pipe 5b forms a return conduit for liquid ammonia flowing from the pipe 5 into the header 3. The opposite ends of the intermediate pipes 5 extend laterally into the headers 3, 4, and their ends are provided with vertical walls 10, each extending upwardly preferably to a plane co-incident to the axis of the adjacent pipe; also, by preference, the end portions of each pipe, within the headers and above the walls 10, are cut away, as shown at 11, to facilitate the supply of ammonia into the pipe and the discharge of it and vapors therefrom. By providing each pipe 5 with end walls, it forms a holder to retain a predetermined amount of liquid ammonia therein, but as the pipe is open above the walls 10, the liquid may be readily and continuously supplied to the pipe and the excess liquid may overflow into either or both headers 3, 4, from which it may return to the lower end of the header 4, the return from the header 3 being through the pipe 5b. The side wall of the header 4, above its bottom end wall 12, is formed with an opening 13. 14 is a casing, forming a chamber, having its open end secured in a gas and liquid tight manner to the walls forming the opening 13. The casing 14 forms an enclosure for a float controlled mechanism 15, to which a float 16 is connected, such mechanism controlling a valve 17 mounted in a supply pipe 18. The pipe 18 leads from a source of liquid ammonia supply and is connected in a suitable manner to the header 4. The casing 14 is related to the pipe 5b in such position that the level of the liquid ammonia in the lower portion of the header 4 or reservoir 4' may be maintained below the return pipe 5b. The float 16 and mechanism 15 controlled thereby are arranged to maintain a substantially predetermined supply of liquid ammonia in the reservoir, or system by automatically opening and closing the valve; for example, when the liquid level in the reservoir drops, due to the liquid ammonia being transformed into vapor, the float 16 causes the opening of the valve 17 to admit additional ammonia into the system and when the level rises to the predetermined level, the float causes the closing of the valve; that is to say, the float 16 will operate the mechanism 15, which in turn will close and open an electric circuit 19. The circuit 19, when closed, energizes the winding of a suitable solenoid, in a housing 20, the core for the solenoid being connected to the valve element of the valve 17 and serving to open the latter. Upon the rise of the ammonia in the header 4, the float will break the circuit 19 and de-energize the solenoid coil, and thus permit the valve 17 to close. The float controlled mechanism comprises a box or holder 21 having trunnions 21' mounted in a pair of supports 21a, 21a, preferably consisting of vertical bars formed integrally with the walls of the casing 14, the bars being provided with removable plates 22 forming with the bars suitable bearings for the trunnions 21'. The trunnions 21' are hollow and extend through the sides of the box 21 (see Fig. 6) for a purpose later set forth. The frame 21 is provided with a cover 21b, which is sealed to the walls of the box, in any suitable manner, to prevent leakage of ammonia thereinto. The cover 21b is omitted in Fig. 3. The bottom of the box 21 supports a cradle 23, in which is removably mounted a mercury tube 24 having contacts 24' connected to leads 25 for the circuit 19. The inner end wall of the box 21 carries a rigid arm 26 to the outer end of which is connected the float 16. 27 indicates liquid and gas tight enclosure means for the leads 25 and extending from the contacts 24' to a point exterior of the box 21. Such enclosure means include the hollow trunnions 21' whereby the leads are sealed against contact with the ammonia and parts or devices movable through openings in the casing 14 or header 4 are avoided. The enclosure means comprise a pair of tubes or pipes 27' each coiled as shown, the inner end of each pipe being suitably secured in a diametrically extending opening formed in one of the trunnions 21' and the outer end portion of the pipe extending through an opening 28 formed in the rear or end wall of the casing 14. As shown, the trunnions 21' are hollow and the leads 25 extend therethrough and through openings formed in the side walls of the pipes 27' into the latter and then longitudinally through the pipes to the outer side of the casing 14, where they are connected to the remaining wires forming the circuit 19. The outer end portions of the pipes 27' are seated in the openings 28 in any suitable manner, as by soldering, to make the casing 14 gas and liquid tight. Where the material of which the pipes 27' are formed does not admit of soldering, any suitable joint, one example of which is shown in Fig. 7, may be used. This form of construction eliminates openings leading through the header 4 and casing 14, or any construction making it necessary to use glands. The pipes 27' are reversely coiled with respect to each other, so that in the event of expansion or contraction, the resulting stress on one pipe will be equalized by the stress on the other pipe; also, the pipes 27' may be made of resilient metal the effect of which will be to restrain undue movement of the box 21 in either direction.

By trunnioning the box 21, I provide a balanced support for the float 16, whereby the latter is readily operated by the rise and fall of the ammonia, such arrangement being advantageous on account of the relatively low specific gravity of the ammonia. By reason of such mounting, the weight of the outer end of the box 21 may be readily increased or decreased and effect the desired counterbalance with respect to the float 16. In normal position, the level of the ammonia in the reservoir 4' serves to tilt the frame 21 slightly upwardly at its inner end; but if this level drops, the float moves downwardly therewith and tilts the tube 24 to effect closing of the circuit 19.

29 indicates a pump, preferably of the rotary type, and comprising a casing 30 fixed to the lower end of the header 4 and a rotor 30' suitably mounted to rotate in the side walls of the casing. The inlet for the casing is connected to a drain duct 31 for the liquid ammonia leading through the bottom wall of the header 4. The outlet from the casing is connected to a riser 32 leading upwardly through the header 4, the rotor 30' of the pump serving to force the liquid ammonia upwardly through the riser. The riser is formed with a plurality of discharge ports 32', one opposite and slightly above the adjacent end wall 10 for each pipe 5, so that the ammonia will be discharged into the latter. As the pump 29 is continuously driven, liquid ammonia is continuously supplied to the intermediate pipes 5, from which it flows into the headers 3, 4; but by reason of the end walls 10, each of said pipes will retain a predetermined amount of the ammonia. As these pipes are open at their ends, the resulting vapors, due to absorption of heat, may freely escape and pass through the pipe 8, without forming gas pockets. The riser 32 is suitably mounted in the end walls of the header 4 and its upper end is closed by a removable plug 33'.

From the foregoing description it will be seen that the headers 3, 4, pipes 5, riser 32 and pump mechanism 29 constitutes a circulating system, and the pipes 8 and 5a provide for the escape of gases or vapors. As the pipes 5 are open at both ends, resulting vapors may freely flow to either header and escape.

33 indicates a holder for the liquid to be treated. The holder 33 is removably supported in any desired manner above and extends longitudinally substantially from end to end of the medium circulating means 2. The holder 33 is provided with one or more series of openings 3' through which the liquid to be treated flows over suitable flow or guide walls 34 onto the pipes 2b of the medium circulating means 2. 3f indicates a cover for the holder 33.

The construction and mounting for the holder 33 and the liquid distributing means therefrom may be similar to like parts shown in the aforesaid patent.

The liquid to be treated is delivered to the holder 33 in any suitable manner. From the holder 33, the liquid flows by gravity over the pipes 2b, 5a, 5, 5b, successively from the upper to the lower one, from which it drops into a receiver 35. The receiver is provided with a suitable discharge pipe 5' to convey away the liquid. The receiver 35 is preferably supported at its opposite ends by lugs provided on the inner walls of the headers 3, 4.

The circulating units 2', 2'', may be enclosed in a casing (a portion of which is shown at 60 in Fig. 2) formed of sections, similar to those shown in the aforesaid patent.

The pump 29 may be driven by a suitable power mechanism, such as an electric motor. The motor and circuit therefor are not shown.

In operation, cold water or brine is caused to circulate through the pipes 2b of the unit 2' and the rotor 39' of the pump is set in operation to circulate liquid ammonia into and through the pipes 5. Milk is then delivered to the holder 33, from which it gravitates over the pipes 2b, 5a, 5 and 5b to the receiver 35. As the milk flows over the pipes 2b it is subjected to a cooling medium at one temperature and as the milk flows over the pipes 5a, 5 and 5b, it is subjected to a cooling medium having a lower temperature.

5x indicates deflectors mounted on each pipe 5a, 5 and 5b and serving to direct the gravitating liquid inwardly and prevent it from adhering to the walls of the headers 3, 4, due to capillary attraction.

It will be noted that the supply conduit or riser 32 extends upwardly in line with the pipes 5 and is provided with a port opposite each thereof, so that the ammonia is supplied to all of said pipes simultaneously.

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting.

What I claim is:

1. In apparatus of the class described, the combination with a liquid holding chamber adapted to be connected to an electrically operated supply means, of a float, a closed casing having hollow trunnions supported in said chamber and carrying a mercury tube having contacts to control the circuit for the supply means, and a pair of reversely coiled tubes having their inner ends connected to said trunnions, the outer end portions of said tubes extending through one wall of said chamber, said trunnions and said tubes forming conduits for the leads from said contacts.

2. In apparatus of the class described, the combination with a liquid holding chamber adapted to be connected with an electrically controlled supply means, of a closed casing mounted on trunnions within said chamber, one of said trunnions being hollow and extending into said casing, a float connected to said casing, a switch means within said casing and automatically operated to open and close the circuit for the supply means due to rise and fall of said float, and a pair of reversely coiled resilient members coiled substantially concentrically to said trunnions and connected thereto at their respective opposite ends and to the walls of said chamber, the member connected to said hollow trunnion being hollow and extending through the wall of said chamber and forming with said hollow trunnion a closed conduit for a lead from said switch means.

3. In apparatus of the class described, the combination of a liquid holding chamber adapted to be connected to an electrically operated supply means, of a device movably mounted on the walls of said chamber and comprising a float and a closed casing, switch means mounted within said casing and automatically operated to open and close the circuit for the supply means due to rise and fall of said float, and enclosure means for that portion of the leads for said circuit leading from said switch means to a point exteriorly of said chamber, said enclosure means comprising hollow trunnions for said casing and reversely coiled tubes formed of resilient metal and having their inner ends connected to said trunnions, respectively, and their outer ends extending through the wall of said chamber.

4. In apparatus of the class described, the combination of a liquid holding chamber adapted to be connected to an electrically operated supply means, of a device movably mounted on the walls of said chamber and comprising a float and a support, a mercury switch mounted on said support and automatically operated to open and close the circuit for the supply means due to rise and fall of said float, and enclosure means for that portion of the leads for the circuit leading from said switch to a point exteriorly of said chamber, said enclosure means comprising hollow trunnions for said device and reversely coiled tubes formed of resilient metal and having their inner ends connected to said trunnions, respectively, and their outer ends extending through the wall of said chamber.

CLIFFORD MORROW.